US010774883B2

(12) United States Patent
Detroyer et al.

(10) Patent No.: US 10,774,883 B2
(45) Date of Patent: Sep. 15, 2020

(54) PASSIVE WET CLUTCH LUBE VALVE WITH A BAILING SYSTEM AND TRANSMISSION INCLUDING THE SAME

(71) Applicant: BORGWARNER INC., Auburn Hills, MI (US)

(72) Inventors: James Detroyer, Riley, MI (US); Calahan Campton, Royal Oak, MI (US); Michael Campbell, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 183 days.

(21) Appl. No.: 16/001,129

(22) Filed: Jun. 6, 2018

(65) Prior Publication Data
US 2019/0376567 A1 Dec. 12, 2019

(51) Int. Cl.
F16D 25/12 (2006.01)
(52) U.S. Cl.
CPC .................................. F16D 25/123 (2013.01)
(58) Field of Classification Search
CPC ........... F16D 25/123; F16D 2048/0209; F16D 2048/0221
See application file for complete search history.

(56) References Cited

U.S. PATENT DOCUMENTS

| 3,104,746 A | 9/1963 | Gadd et al. |
| 3,366,210 A | 1/1968 | Webster |
| 4,478,237 A * | 10/1984 | Blake ...................... F16D 25/14 137/116.3 |
| 4,540,078 A | 9/1985 | Wetrich |
| 4,557,363 A * | 12/1985 | Golan ................... F16D 25/123 188/264 E |
| 4,640,401 A | 2/1987 | Koltookian |
| 7,565,915 B2 * | 7/2009 | Krug-Kussius ....... F16K 17/105 137/491 |

(Continued)

FOREIGN PATENT DOCUMENTS

| EP | 0654127 B1 | 9/1997 |
| WO | 2014019581 A1 | 2/2014 |

OTHER PUBLICATIONS

English language abstract and machine-assisted English translation for WO 2014/019581 extracted from espacenet.com database on Jun. 21, 2018, 15 pages.

Primary Examiner — Stacey A Fluhart
(74) Attorney, Agent, or Firm — Howard & Howard Attorneys PLLC

(57) ABSTRACT

A clutch system includes a clutch plate and a reservoir coupled with the clutch plate. The reservoir is configured to receive bailed excess fluid from the clutch upon rotation of the clutch plate. The clutch system also includes a hydraulic control valve fluidly coupled with the clutch plate and the reservoir. A first fluid flow path is defined between the reservoir and the clutch plate. Moreover, the hydraulic control valve includes an orifice fluidly coupled with the reservoir and a lube valve configured to move between a closed position and an open position. Additionally, a cavity is defined in the hydraulic control valve. Finally, the movement of the lube valve between the open position and the closed position is controlled using the fluid from the reservoir which flows though the orifice and into the cavity.

40 Claims, 12 Drawing Sheets

(56) References Cited

U.S. PATENT DOCUMENTS

| | | | |
|---|---|---|---|
| 8,408,363 B2* | 4/2013 | Richard | B60K 17/28 184/35 |
| 9,688,141 B2 | 6/2017 | Takaishi et al. | |
| 2005/0126878 A1* | 6/2005 | Samie | F16D 13/64 192/113.36 |
| 2011/0042177 A1* | 2/2011 | Bauer | F16D 25/123 192/85.61 |
| 2013/0228411 A1 | 9/2013 | Wesley et al. | |

* cited by examiner

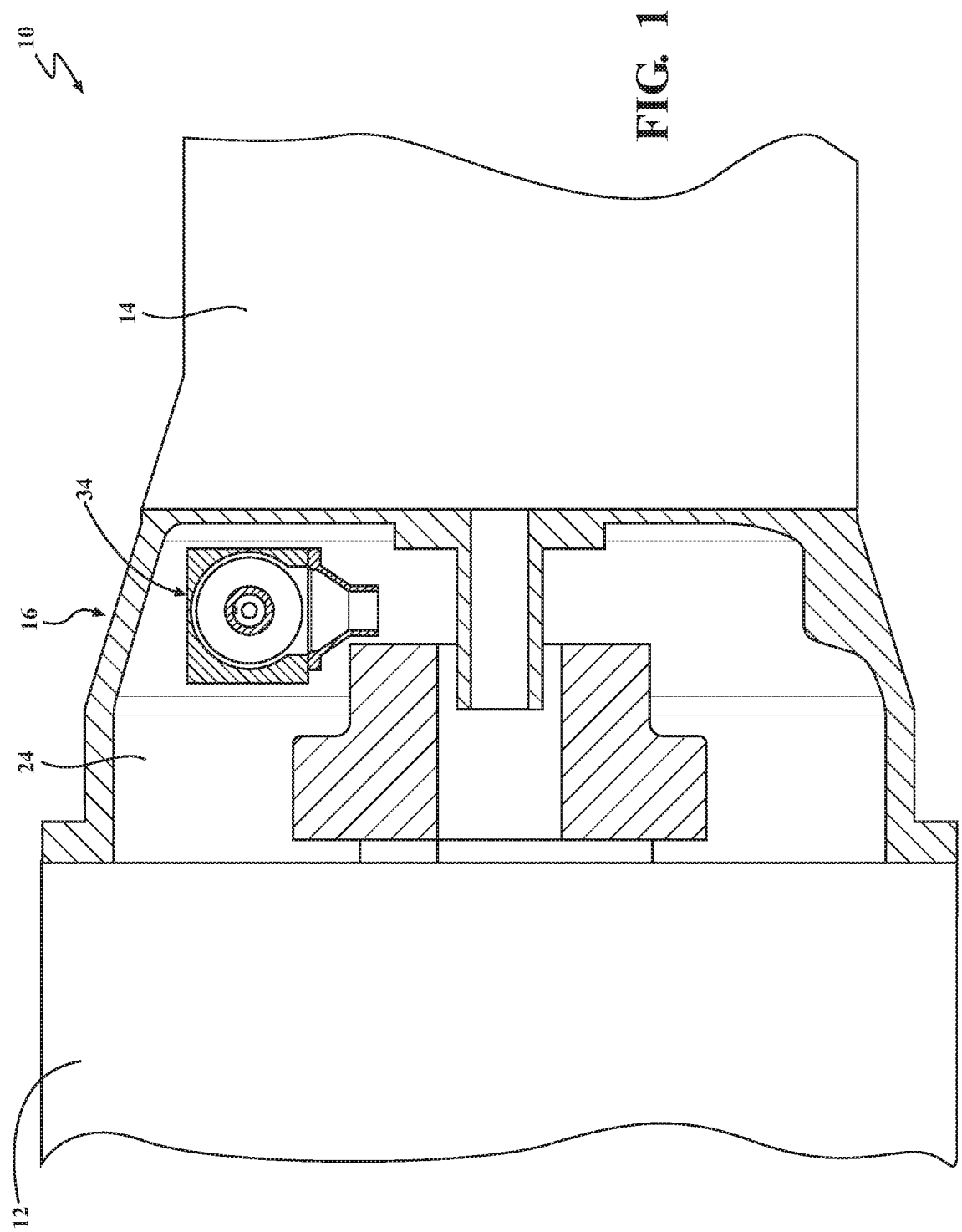

PASSIVE WET CLUTCH LUBE VALVE WITH A BAILING SYSTEM AND TRANSMISSION INCLUDING THE SAME

BACKGROUND OF THE INVENTION

1. Field of the Invention

The subject invention generally relates to a clutch system which includes a bailing system and a passive hydraulic control valve for controlling a fluid and a method of controlling the hydraulic control valve.

2. Description of the Related Art

Conventional vehicles include an engine operably coupled with a clutch system. The clutch system typically includes a clutch plate, a valve, and a pump which is configured to move a fluid to the valve to provide lubrication to the clutch plate. In the conventional clutch system, the clutch plate spins, when activated by the engine, and excess fluid falls to a sump.

Conventional vehicles may use the pump to move the fluid from the sump back through the valve to lubricate the clutch plate. However, using a pump to re-use the fluid which has fallen to the sump requires additional power usage and additional materials which adds undesirable weight to the vehicle. As such, there remains a need for re-using the excess fluid from the clutch plate without the use of a pump or other electronics. Additionally, there remains a need for a hydraulic control valve which passively allows fluid to flow to the clutch after clutch slipping, without the use of electronics.

SUMMARY OF THE INVENTION AND ADVANTAGES

A clutch system which is operably coupled to a vehicle engine is disclosed. The clutch system includes a clutch plate configured to rotate when the engine is activated. The clutch system also includes a reservoir coupled with the clutch plate. The reservoir is configured to receive excess fluid bailed from the clutch plate upon rotation of the clutch plate. The clutch system also includes a hydraulic control valve fluidly coupled with the clutch plate and the reservoir. A first fluid flow path is defined between the clutch plate and the reservoir. Moreover, the hydraulic control valve includes a projection defining an orifice fluidly coupled with the reservoir and a lube valve configured to move between a closed position where the first fluid flow path is blocked and an open position where the first fluid flow path is fully open. Additionally, a cavity is defined in the hydraulic control valve when the lube valve is in the closed position or between the closed position and the open position. Finally, the movement of the lube valve between the closed position and the open position is controlled using the fluid from the reservoir which is configured to flow though the orifice and into the cavity.

A clutch system which is operably coupled to a vehicle engine and disposed within a bellhousing is disclosed. The clutch system includes a clutch plate configured to rotate when the engine is activated. The clutch system also includes a reservoir coupled with the clutch plate. The reservoir is configured to receive excess fluid bailed from the clutch plate upon rotation of the clutch plate. The clutch system also includes a hydraulic control valve fluidly coupled with the clutch plate and the reservoir. A first fluid flow path is defined between the clutch plate and the reservoir. Moreover, the hydraulic control valve includes a projection defining an orifice fluidly coupled with the bellhousing and a lube valve configured to move between a closed position where the first fluid flow path is blocked and an open position where the first fluid flow path is fully open. Additionally, a cavity is defined in the hydraulic control valve when the lube valve is in the closed position or between the closed position and the open position. Finally, the movement of the lube valve between the closed position and the open position is controlled using the fluid from the bellhousing which is configured to flow though the orifice and into the cavity.

A vehicle transmission system that is operably coupled to a vehicle engine is disclosed. The transmission system includes a vehicle transmission coupled to the vehicle engine and includes a bellhousing. Additionally, the vehicle transmissions system includes the clutch system disposed within the bellhousing. A method of controlling the hydraulic control valve in the clutch system is also disclosed.

The ability to utilize a bailing system which includes a clutch plate and a reservoir to provide lubrication to the clutch plate offers all of the benefits of pumping excess fluid from a sump to be used to lubricate the clutch without the added expense, energy usage, or space requirements of using a pump.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a cross-sectional view of a vehicle having a powertrain system;

DETAILED DESCRIPTION OF THE INVENTION

Figure 2A:
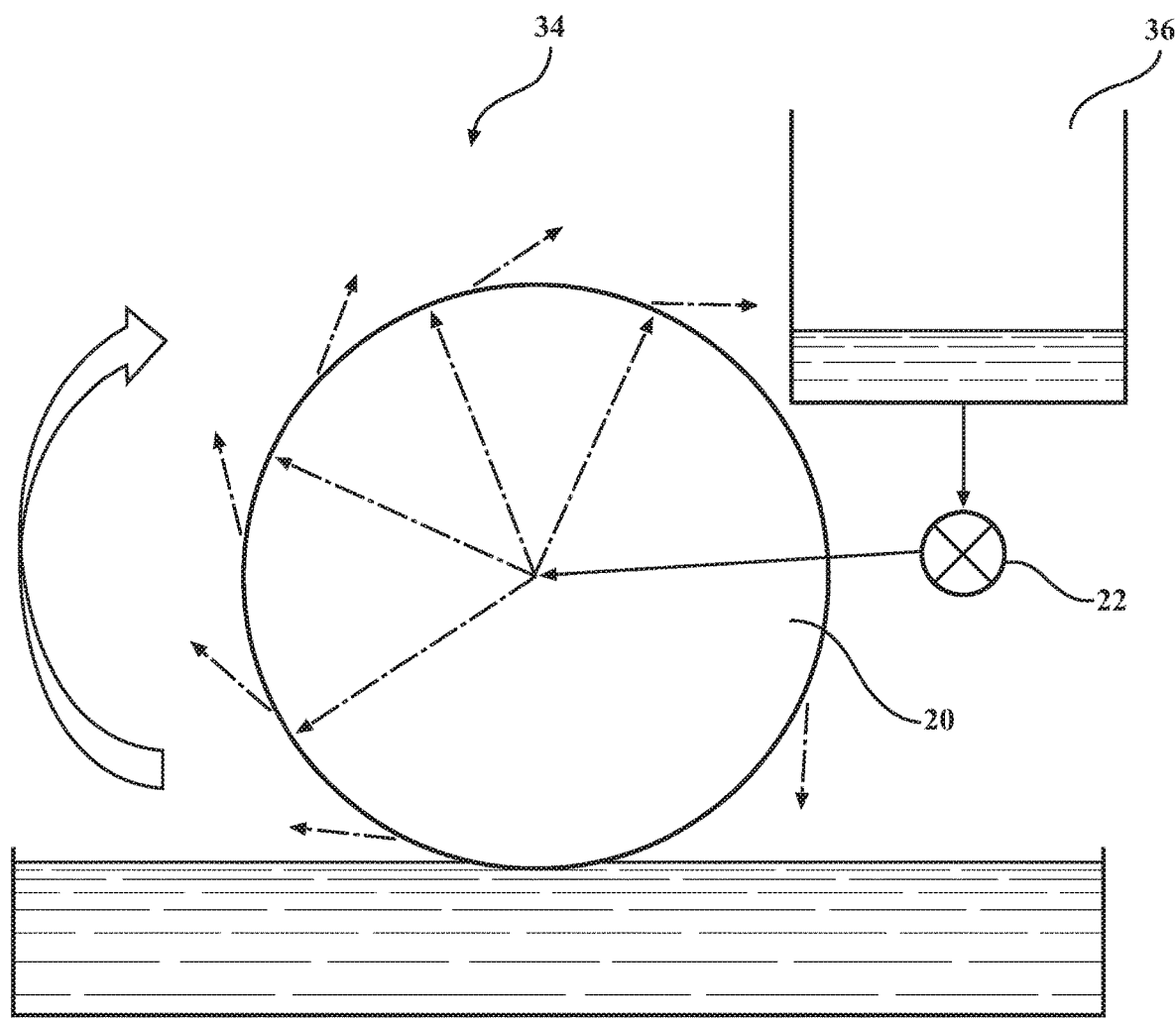
FIG. 2A is a schematic view of a clutch system.

Referring now to the figures, where like numerals are used to designate like structure unless otherwise indicated, a powertrain system of a vehicle is schematically illustrated at 10 in the figures. As illustrated in FIG. 1, the powertrain system 10 which includes an engine 12 in rotational communication with a transmission 14. The transmission 14 may be any type of transmission including a manual, automatic, or semi-automatic transmission as known by one of ordinary skill in the art. In one exemplary embodiment, the transmission 14 is a manual transmission; however, it is contemplated that transmission 14 may be any type of automatic or semi-automatic transmission including but not limited to a dual-clutch transmission (DCT). It should also be appreciated that the engine 12 and the transmission 14 of FIG. 1 are of the type employed in a conventional "transverse front wheel drive" powertrain system. It should further be appreciated that the engine 12 and/or transmission 14 could be configured in any suitable way sufficient to generate and translate rotational torque so as to drive the vehicle 10, without departing from the scope of the present invention.

The engine 12 generates rotational torque which is selectively translated to the transmission 14 which, in turn, translates rotational torque through a clutch system 16 to one or more wheels. The transmission 14 is typically controlled using hydraulic fluid. To this end, flow of the fluid to the clutch system 16, and more specifically, to a clutch plate 20 of the clutch system 16 is controlled using a hydraulic control valve 22.

Referring still to the embodiment illustrated in FIG. 1, a clutch system 16 is fluidly coupled to the powertrain system 10 and is configured for moving the hydraulic fluid to the clutch plate 20 when desired, for cooling and/or lubrication purposes. As best illustrated in FIG. 1, the clutch system 16 is typically disposed in a bellhousing 24 of the transmission 14 which is typically disposed adjacent to the engine 12 and to the remainder of the transmission. The clutch system 16 is typically a wet clutch system but may be any type of clutch system as known by one of ordinary skill in the art, including but not limited to any type of friction clutch system.

The clutch system 16 includes a clutch having the clutch plate 20. In the embodiment illustrated in FIG. 2, the clutch plate 20 is a round disc shaped plate having an aperture defined through the center. However, it is also contemplated that the clutch plate 20 may be another shape or may have any number of apertures, or may have no apertures, as desired by one of ordinary skill in the art. Moreover, as illustrated in FIG. 2B, a top surface 26 of the clutch plate 20 includes at least one protrusion 28 extending therefrom. In the embodiment illustrated in FIG. 2B, the top surface is a flat surface of the clutch plate 20, however, it is contemplated that the top surface 26 may be any surface of the clutch plate 20 including but not limited to either flat surface or the curved surface of a disk-shaped clutch plate. In the embodiment illustrated in FIG. 2B, the top surface 26 of the clutch plate 20 includes a plurality of circumferentially spaced apart protrusions 28 disposed about the clutch plate 20. In the embodiment illustrated in FIG. 2B, the protrusions 28 extend radially from the aperture to the distal edge of the top surface 26 of the clutch plate 20. However, it is also contemplated that the protrusions 28 may be disposed in another arrangement including but not limited to an alternating protrusion arrangement, a triangular arrangement, or a quartered arrangement. Additionally, it is contemplated that the protrusion 28 may extend in a straight line from the aperture of the distal edge of the top surface 26 of the clutch plate 20 or the protrusion 28 may include one or more curved portions. Furthermore, it is contemplated that the protrusions 28 do not extend all the way to the aperture and/or all the way to the distal edge of the top surface 26 of the clutch plate 20 and only extend a portion thereof. Additionally, it is contemplated that each of the plurality of protrusions may be of the same shape, size, and/or configuration as one another, or each of the plurality may be of a different shape, size, and/or configuration from one another, or a combination thereof.

The protrusions 28 also have a height defined as the distance the protrusion 28 extends from the top surface 26 of the clutch plate 20. It is contemplated that the protrusions 28 may have a constant height or may have a height which varies as the protrusion 28 extends towards the distal edge of the top surface 26 of the clutch plate 20. In the embodiment illustrated in FIG. 2B, the height of the protrusion 28 increases as the protrusion 28 extends towards the distal edge of the top surface 26. However, it is also contemplated that the height of the protrusion 28 may decrease as the protrusion 28 extends towards the distal edge of the top surface 26. Moreover, it is contemplated that the height of the protrusion 28 may increase and then decrease as the protrusion 28 extends towards the distal edge of the top surface 26.

Moreover, the protrusions 28 also have a thickness defined as a distance between a first side wall 30 of the protrusion 28 and a second side wall 32 of the protrusion 28. It is contemplated that the protrusions 28 may have a constant thickness or may have a thickness which varies as the protrusion 28 extends towards the distal edge of the top surface 26 of the clutch plate 20. In the embodiment illustrated in FIG. 2B, the thickness of the protrusion 28 decreases as the protrusion 28 extends towards the distal edge of the top surface 26. However, it is also contemplated that the thickness of the protrusion 28 may increase as the protrusion 28 extends towards the distal edge of the top surface 26. Moreover, it is contemplated that the thickness of the protrusion 28 may increase and then decrease as the protrusion 28 extends towards the distal edge of the top surface 26.

As described above, the clutch plate 20 is configured to rotate when the engine 12 is activated. Moreover, when the clutch plate 20 is rotating, the protrusions 28 on the clutch plate 20 are configured to guide excess fluid, using the centripetal force created by the clutch plate 20 rotating, toward a desired location in order to re-use the excess fluid. As such, it is contemplated that the protrusions 28 may be of any shape, size, configuration, and amount as desired by one of ordinary skill in the art to guide the excess fluid towards the desired location.

Figure 2B:
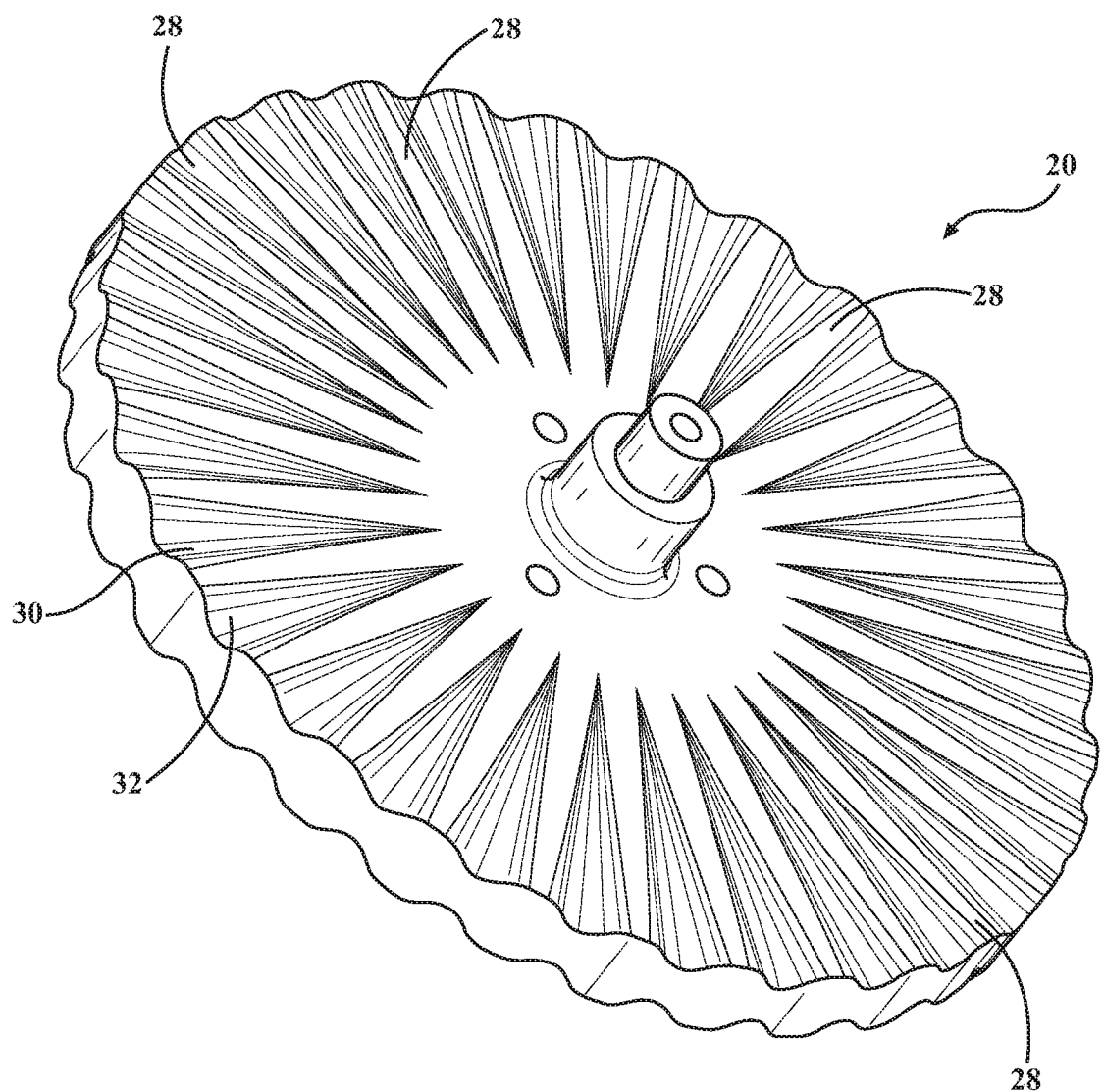
FIG. 2B is a perspective view of an exemplary clutch plate of the clutch system.
Figure 2C:
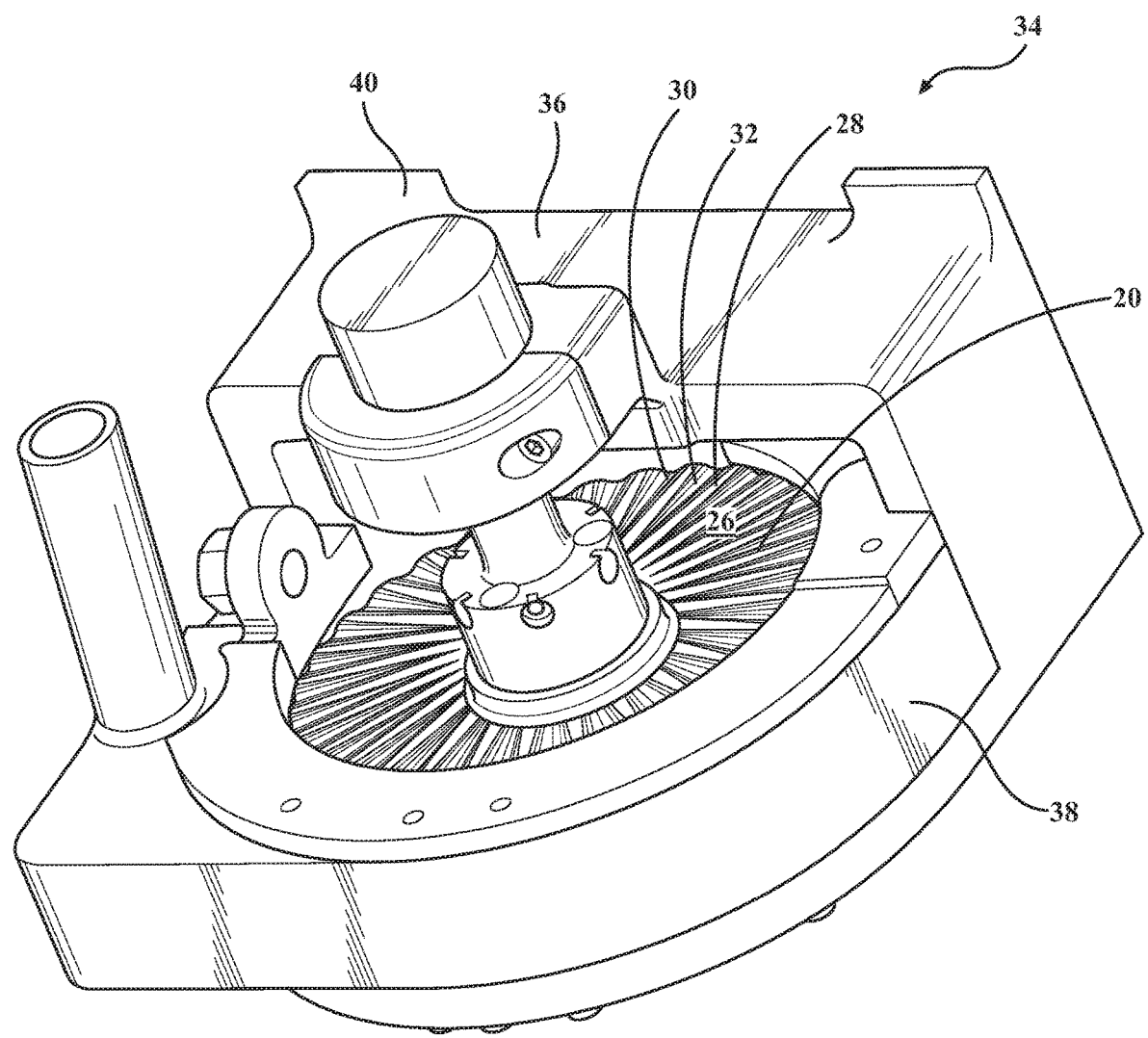
FIG. 2C is a perspective view of a bailing system of the clutch system.

One embodiment of a bailing system 34 is schematically illustrated in FIG. 2, which includes the clutch plate 20 and a reservoir 36. In another embodiment of the bailing system 34, the clutch plate 20 comprises a bailing disk fixedly coupled to a clutch plate such that when the engine activates the clutch plate 20 the bailing disk rotates as well. Moreover, in this embodiment, the bailing disk includes the protrusions 28 configured to guide excess fluid into the reservoir 36 upon rotation. In the embodiment illustrated in FIG. 2, the protrusions 28 of the clutch plate 20 are configured to guide the excess fluid into the reservoir 36 upon rotation of the clutch plate 20. It is contemplated that the reservoir 36 may receive the excess fluid through one or more of an inlet aperture defined in the reservoir 36, a closed tube, an open channel 38, or another method as known by one of ordinary skill in the art. In the embodiment illustrated in FIG. 2C, the protrusions 28 are configured to guide the excess fluid into a channel 38 which delivers the excess fluid into the reservoir 36. In the embodiment illustrated in FIG. 2C, the channel 38 is a tube having an opening at one end to receive the fluid from the clutch plate 20 and an opening at the opposite end to allow the fluid to flow into the reservoir 36. It is also contemplated that the channel 38 may be an open channel such that excess fluid may be received into the channel 38 anywhere along a length of the channel 38. Moreover, it is contemplated that the protrusions 28 are configured to guide the fluid directly into the reservoir 36 without the use of the channel 38, as desired by one of ordinary skill in the art. Additionally, it is contemplated that excess fluid may be guided into the channel 38 and directly into the reservoir 36 simultaneously, as desired by one of ordinary skill in the art. Additionally, it is contemplated that the clutch system 30 may include a plurality of reservoirs 36 disposed in any arrangement to collect to fluid from the rotating clutch plate 20.

Figure 3A:
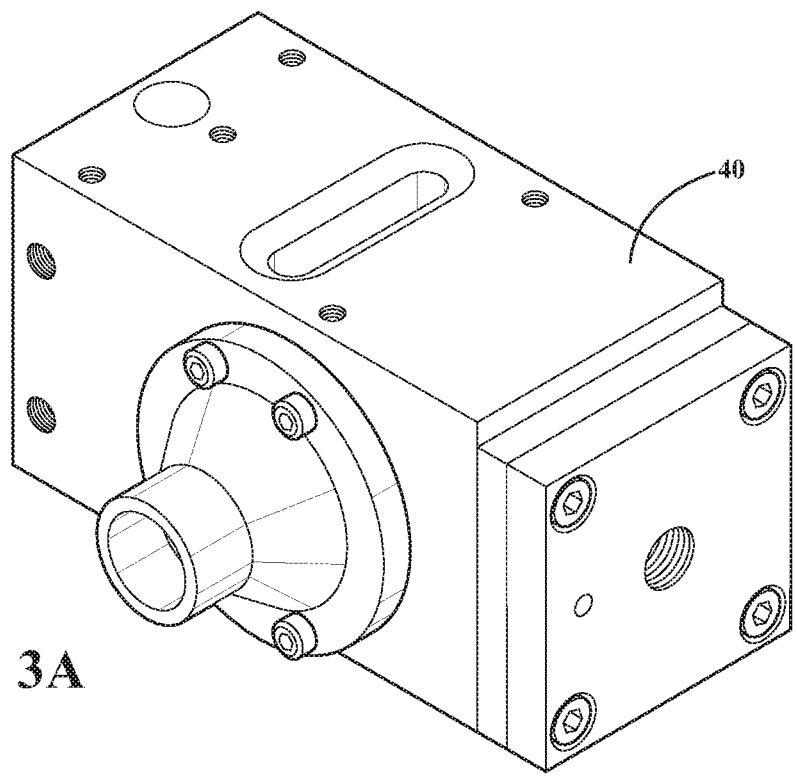
FIG. 3A is a perspective view of a housing of a portion of the clutch system.
Figure 3B:
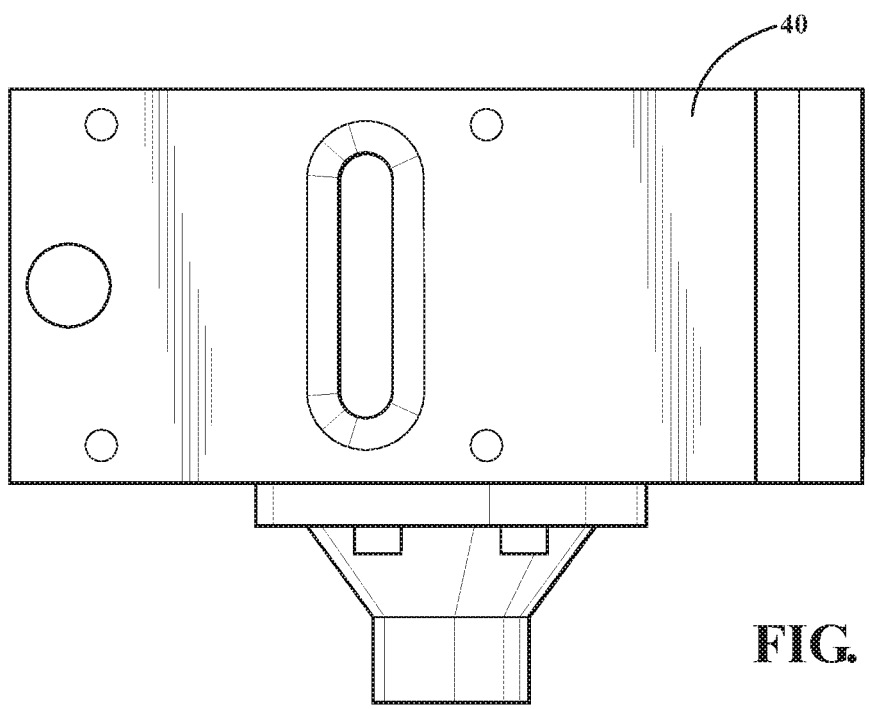
FIG. 3B is a top view of the housing of the clutch system.

As best illustrated in FIGS. 3A and 3B the reservoir 36 and the hydraulic control valve 22 are disposed in a housing 40. In the embodiment illustrated in FIGS. 3A and 3B, the housing 40 is a generally rectangular housing 40 having a plurality of apertures for coupling with other devices. It is contemplated that the housing 40 may have any number of apertures as desired by one of ordinary skill in the art. Additionally, it is contemplated that the housing 40 may be comprised of steel. However, it is also contemplated that the housing 40 may be comprised of any material including but not limited to stainless steel, aluminum, or a plastic polymer.

Figure 4:
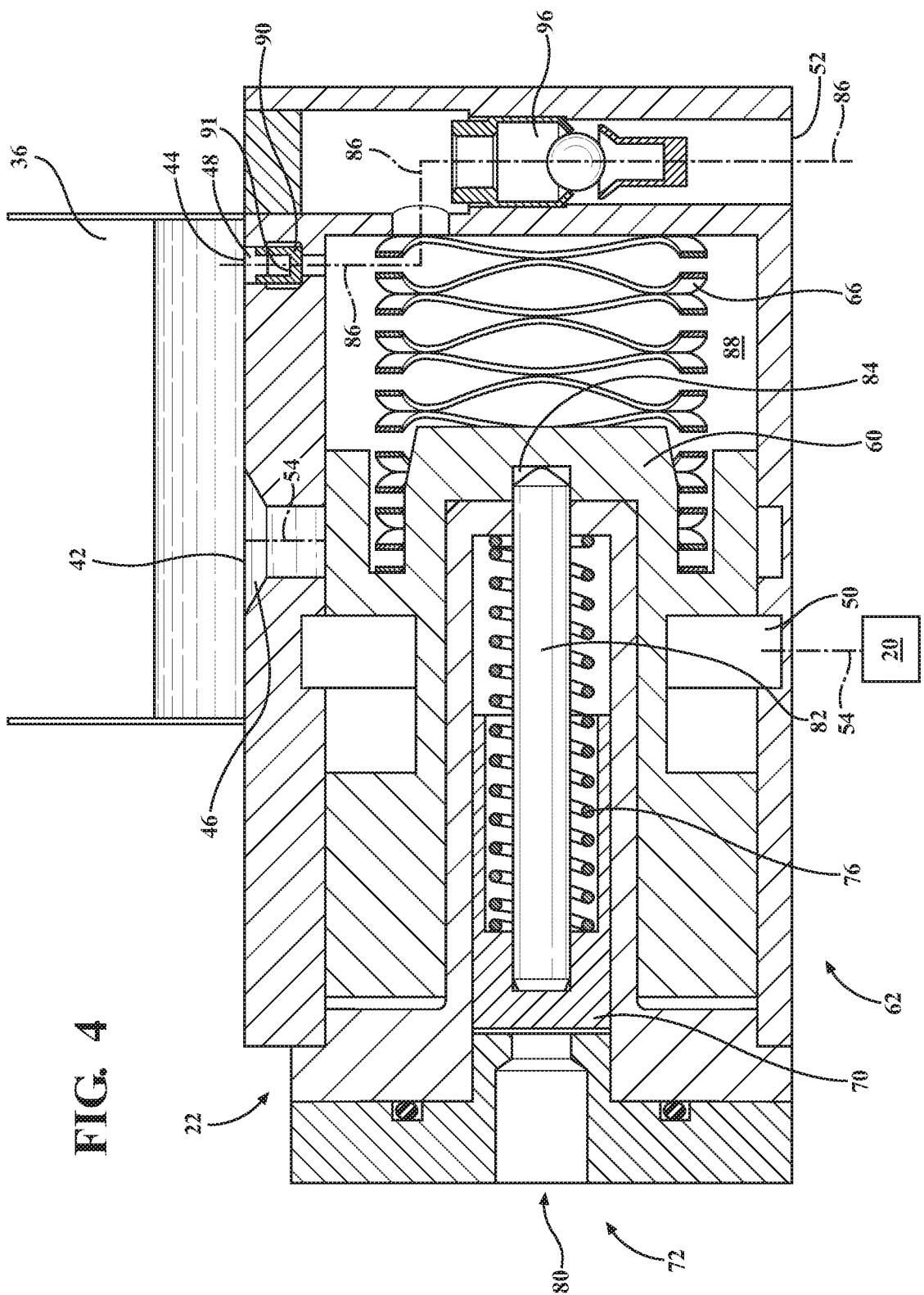
FIG. 4 is a cross-sectional view of the clutch system.
Figure 5:
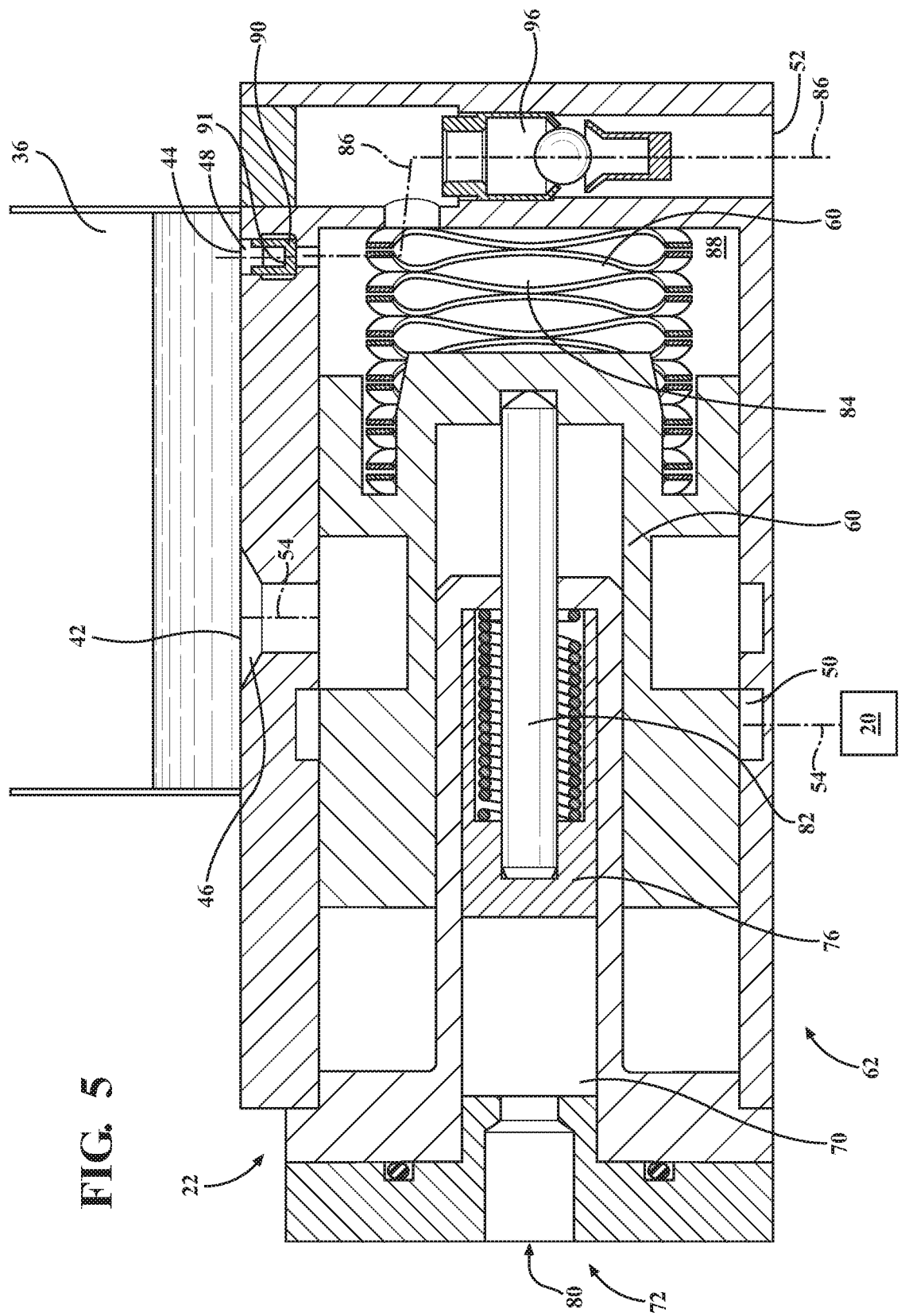
FIG. 5 is a cross-sectional view of the clutch system having a lube valve in a closed position.

In the embodiment illustrated in FIG. 4, the reservoir 36 has a generally rectangular cross section, however it is contemplated that the reservoir 36 may be any size or shape as desired by one of ordinary skill in the art. As illustrated in FIG. 1, the reservoir 36 is generally disposed in the bellhousing 24 such that the size and shape of the bellhousing 24 may delimit the size and shape of the reservoir 36. However, it is also contemplated that the reservoir 36 may be disposed elsewhere in the powertrain system. As additionally illustrated in FIG. 4, the reservoir 36 includes a plurality of outlets. In the embodiment illustrated in FIG. 4, the reservoir 36 includes a first outlet 42 and a second outlet 44, however, any number of outlets may be included.

Referring now to FIGS. 4-9, the reservoir 36 is fluidly coupled with the hydraulic control valve 22. The hydraulic control valve 22 is fluidly coupled to both the clutch plate 20 and the reservoir 36 and is configured to control fluid flow from the reservoir 36 to the clutch plate 20. In the embodiment illustrated in FIGS. 5-9, the hydraulic control valve 22 includes a first inlet 46 and a second inlet 48 along with a first outlet 50 and a second outlet 52. However, it is also contemplated that the hydraulic control valve 22 may include any number of inlets and/or outlets, as desired by one of ordinary skill in the art. The hydraulic control valve 22 also defines a first fluid flow path 54 which is configured to provide lubrication to the clutch from the reservoir 36, when desired. More specifically, the first fluid flow path 54 is a path in which fluid is configured to flow from the first outlet 42 of the reservoir 36, through the first inlet 46 of the hydraulic control valve 22, through the first outlet 50 of the hydraulic control valve 22, and to the clutch.

Figure 6:
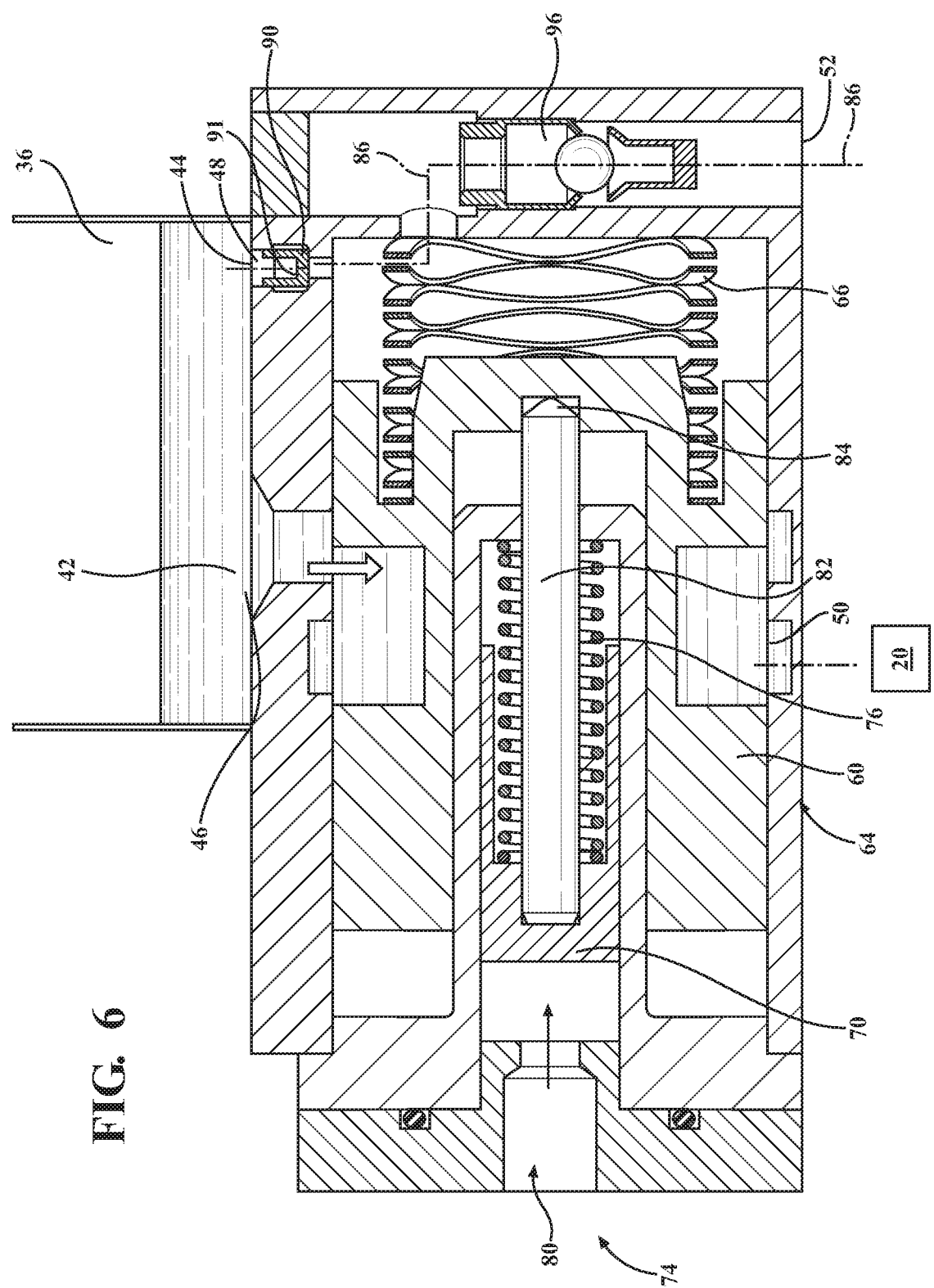
FIG. 6 is a cross-sectional view of the clutch system having the lube valve in an open position.
Figure 7:
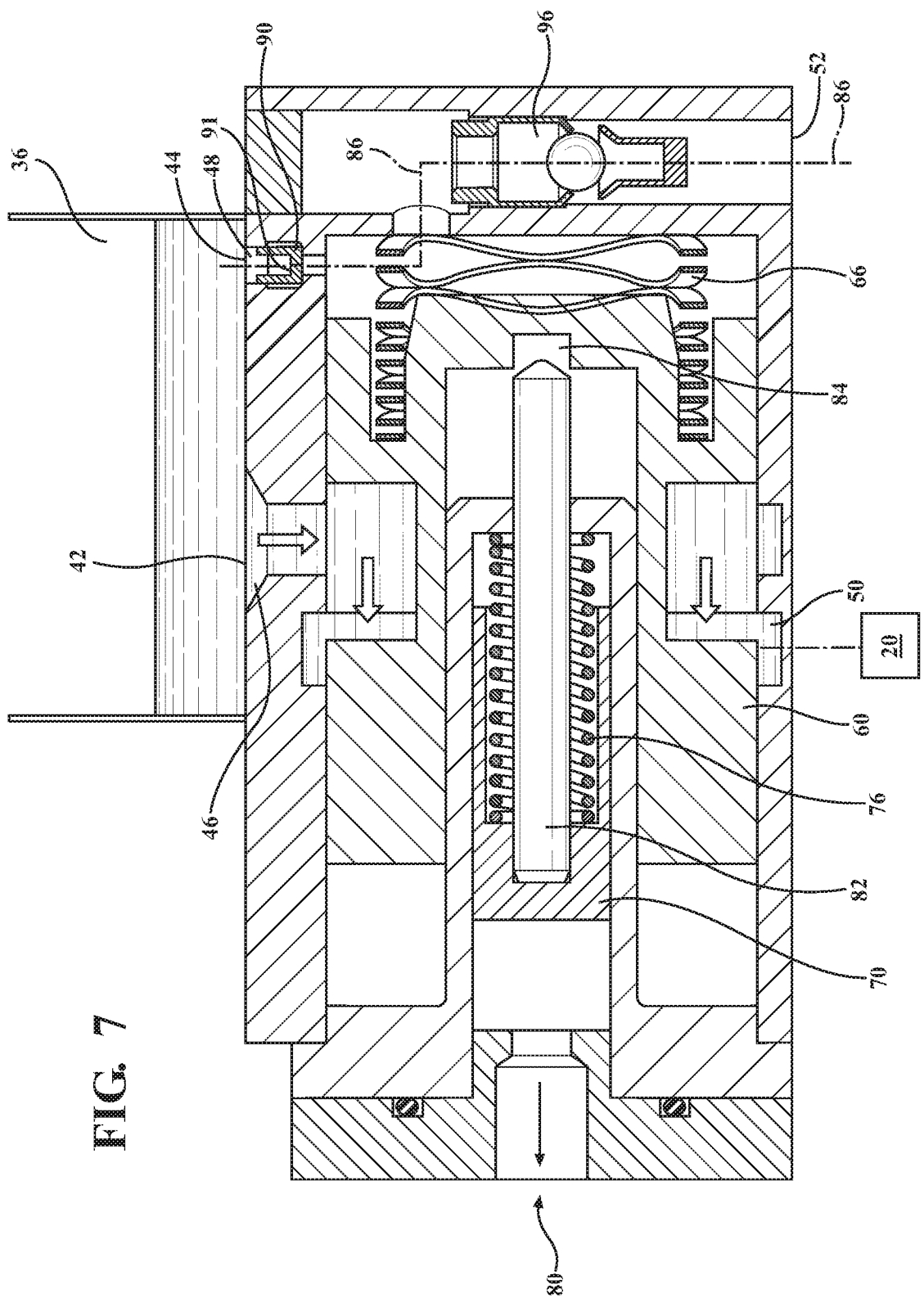
FIG. 7 is a cross-sectional view of the clutch system having the lube valve between the closed position and the open position.
Figure 8:
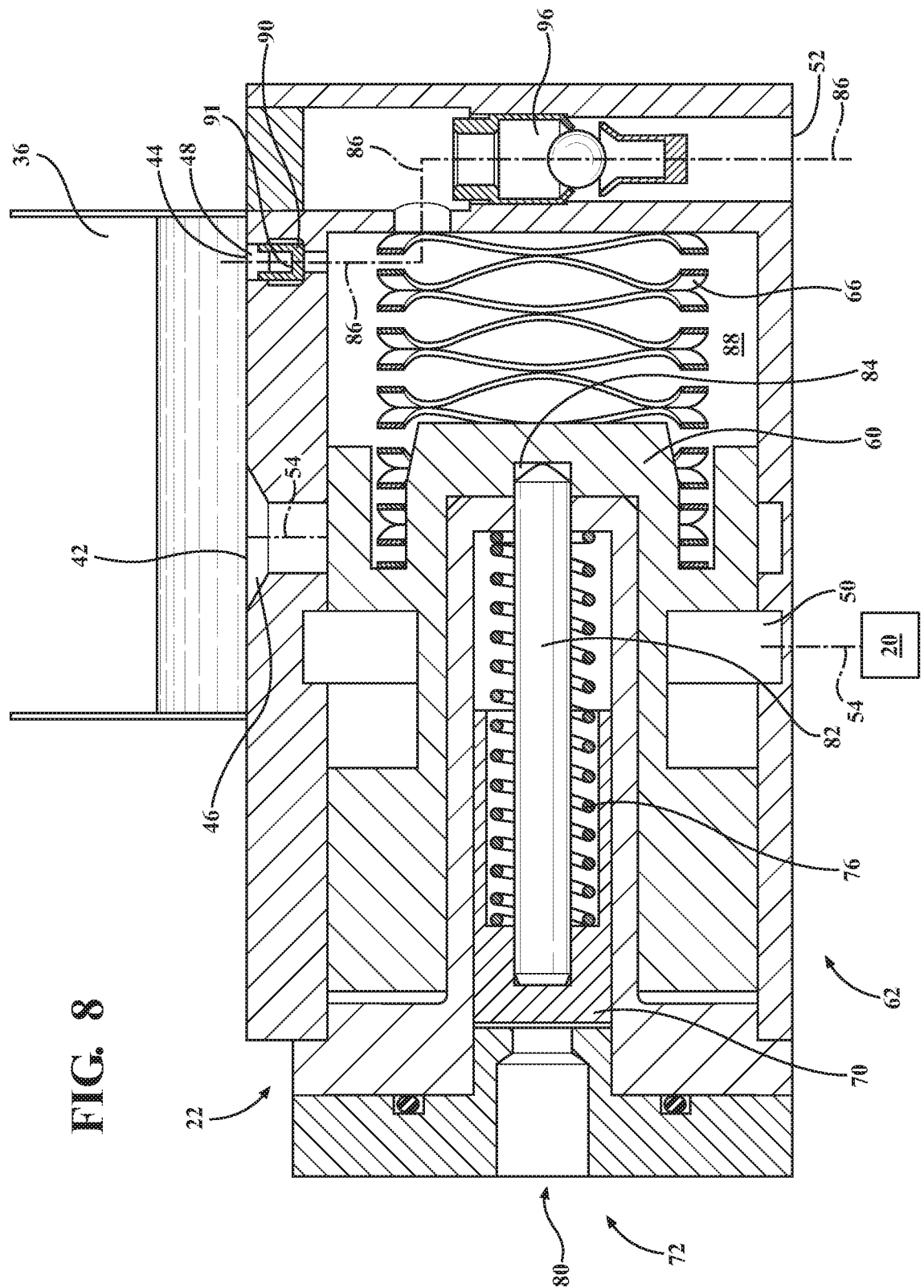
FIG. 8 is a cross-sectional view of the clutch system having the lube valve returned to the closed position.

The hydraulic control valve 22 also includes a lube valve 60. The lube valve 60 may be a piston or other device which is configured to move between a closed position 62 and an open position 64. In the embodiment illustrated in FIGS. 4-9, when the lube valve 60 is in the closed position 62, as illustrated in FIG. 6, the lube valve 60 is fully blocking the first flow path such that no fluid flows to the clutch. Moreover, as the embodiment illustrated in FIGS. 4-9, when the lube valve 60 is in the open position 64, as illustrated in FIG. 7, the first fluid flow path 54 is fully open such that the lube valve 60 is not blocking the first fluid flow path 54. In the embodiment illustrated in FIG. 6, the lube valve 60 is generally cylindrical in shape having a cut-out portion which aligns with the first fluid flow path 54 when the lube valve 60 is in the open position 64 and allows fluid to flow therethrough. However, it is also contemplated that the lube valve 60 may have any other shape configured to block the first flow path in a closed position 62 and allow fluid flow through the first flow path in the open position 64 including but not limited to ring shaped, conical, disk-shaped, or rectangular. In the embodiment illustrated in FIGS. 4-9, the lube valve 60 is comprised of steel, however, it is also contemplated that the lube valve 60 may be comprised of another material including but not limited to stainless steel, a plastic polymer, or aluminum, as desired by one of ordinary skill in the art. In the embodiment illustrated in FIGS. 4-9, the lube valve 60 is a spring-biased valve such that the lube valve 60 includes a spring 66. In one embodiment, the spring 66 allows the lube valve 60 to move from the closed position 62 to the open position 64.

As illustrated in FIGS. 4-9, the hydraulic valve assembly also includes an actuation valve 70. The actuation valve 70 is configured to move between a rest position and an actuated position 74. Moreover, the actuation valve 70 is configured to move the lube valve 60 from the closed position 62 to the open position 64. In the embodiment illustrated in FIGS. 4-9, the actuation valve 70 is generally cylindrical and is disposed adjacent to the lube valve 60. It is also contemplated that the actuation valve 70 may be of any shape including but not limited to conical, disk-shaped, or rectangular. In the embodiment illustrated in FIGS. 4-9, the actuation valve 70 is comprised of steel, however, it is also contemplated that the actuation valve 70 may be comprised of another material including but not limited to stainless steel, a plastic polymer, or aluminum, as desired by one of ordinary skill in the art. In the embodiment illustrated in FIGS. 4-9, the actuation valve 70 is a spring-biased valve such that the actuation valve 70 includes a spring 76.

In one embodiment, the clutch input 80 acts on the spring 76 to move the actuation valve 70 from the rest position to the actuated position 74 such that the movement of the lube valve 60 from the closed position 62 to the open position 64 is actuated by a clutch input 80. In one embodiment, the clutch input 80 is the coupled with the clutch pedal which is actuated when a gear change is desired by a driver. It is also contemplated that the clutch input 80 may be any type of input 80, including but not limited to a hydraulic input, a mechanical input, or an electronic input. In the embodiment illustrated in FIGS. 5-9, the clutch input 80 actuates the actuation valve 70 to move from the rest position to the actuated position 74 which moves the lube valve 60 from the closed position 62 to the open position 64. More specifically, in the embodiment illustrated in FIGS. 5-9, the actuation valve 70 includes an actuation pin 82 which is configured to engage the lube valve 60 to move the lube valve 60 from the closed position 62 to the open position 64. As best illustrated in FIG. 6, it is contemplated that the lube valve 60 may include a notch 84 or other engagement element which is configured to allow the actuation pin 82 to engage the lube valve 60 and move the lube valve 60 from the closed position 62 to the open position 64. As illustrated in FIG. 7, the actuation valve 70 may be independent of the lube valve 60 such that the actuation valve 70 may move from the actuated position 74 back to the rest position independently of the lube valve 60.

The hydraulic control valve 22 further defines a second fluid flow path 86. In the second fluid flow path 86, the fluid is configured to flow from the second outlet 44 of the reservoir 36, through the second inlet 48 of the hydraulic control valve 22, and into a cavity 88 defined in the hydraulic control valve 22. The cavity 88 is defined in the hydraulic control wall between the lube valve 60 and a wall of the hydraulic control valve 22. Additionally, the hydraulic control valve 22 includes an orifice 90 disposed between the second inlet 48 of the hydraulic control module and the cavity 88. The orifice 90 is of the size and shape to allow the fluid to flow into the cavity 88 at a predetermined rate. In the embodiment illustrated in FIGS. 5-9, the orifice 90 is defined by a projection 91 extending into the second fluid flow path 86 having the orifice 90 defined therethrough to allow fluid to continue flowing into the cavity 88. The projection 91 may be generally U-shaped such that a portion of the projection lines the inlet 48. The remainder of the projection 91 is typically flat having the orifice 90 defined therethrough. In the embodiment illustrated in FIGS. 5-9, the orifice is circular and centrally defined on the projection 91, however, it is also contemplated that the orifice may be of any shape, size, or location to allow the desired flow rate of fluid into the cavity 88. It is also contemplated that the projection which defines the orifice may be of any shape and size, as desired by one of ordinary skill in the art. In some embodiments, it is additionally contemplated that fluid flowing into the cavity is air or another gas without departing from the spirit of the invention.

In another exemplary embodiment, the second fluid flow path 86 is defined as the fluid flow path from the bellhousing 24 through the second inlet 48 of the hydraulic control valve 22, and into the cavity 88 defined in the hydraulic control valve 22. In this embodiment, it is contemplated that the fluid may be the same liquid fluid as described above, or the fluid may be air such that ambient air from the bellhousing 24 flows into the cavity 88. In this embodiment, the orifice is fluidly coupled to the bellhousing 24 and the movement of the lube valve between the closed position and said the position is controlled using the fluid from the bellhousing 24 which is configured to flow through the orifice and into the cavity.

As illustrated in the embodiment shown in FIGS. 5-9, when the clutch input 80 is actuated and the lube valve 60 is moved from the closed position 62 to the open position 64, the lube valve 60 pushes the fluid in the cavity 88 to the second outlet 52 of the hydraulic control valve 22. It is contemplated that the second outlet 52 of the hydraulic control valve 22 may include a check valve 96. In the embodiment illustrated in FIGS. 5-9, the check valve 96 is a ball check valve, however, it is contemplated that the check valve 96 may be any type of valve configured to prevent backflow. Moreover, it is contemplated that the second outlet 52 may be fluidly coupled to the fluid reservoir 36 such that fluid which exits the second outlet 52 flows to the sump. Additionally, it is also contemplated that the second outlet 52 is fluidly coupled to a sump such that when fluid exits the second outlet 52 the fluid is moved to the sump.

When the clutch input 80 is deactivated, the actuation valve 70 moves back to the rest position. As described above, the actuation valve 70 is configured to move independently of the lube valve 60 from the actuated position 74 back to the rested position. Therefore, the lube valve 60 remains in open position 64 which allows fluid to remain flowing to the clutch. However, the movement of the actuation valve 70 back to the rest position creates a vacuum force which forces fluid from the reservoir 36 through the second inlet 48 of the hydraulic control valve 22, through the orifice 90, and into the cavity 88. As more fluid enters the cavity 88, the lube valve 60 slowly returns to the closed position 62. However, by not returning to the closed position 62 immediately upon deactivation of the clutch input 80, the clutch is supplied with lubrication after the clutch input 80 has been deactivated.

In operation, as illustrated in FIGS. 5-9, when the engine 12 is activated, the clutch plate 20 begins rotating. The rotating clutch plate 20 uses the protrusion 28 to guide excess fluid from the clutch plate 20 into the reservoir 36. When a clutch input 80 is activated, i.e. by a driver pressing a clutch pedal, the actuation valve 70 moves from the rest position to the actuated position 74 which moves the lube valve 60 from the closed position 62 to the open position 64. When the lube valve 60 is in the open position 64, fluid flows freely in the first fluid flow path 54 such that fluid from the reservoir 36 goes through the valve and to the clutch. When the clutch input 80 is deactivated, i.e. by a driver letting go of the clutch pedal, the actuation valve 70 moves from the actuated position 74 back to the rest position. The movement of the actuation valve 70 back to the rest position causes fluid to flow through the second outlet 44 of the reservoir 36, through the orifice 90, and into the cavity 88. As the cavity 88 fills, the fluid pushes the lube valve 60 back to the closed position 62. The flow of the fluid from the reservoir 36 to the cavity 88 is controlled by the orifice 90 such that the movement of the lube valve 60 back to the closed position 62 is slowed which provides additional fluid to the clutch. This additional fluid allows for cooling of the clutch and reduced drag. When the clutch input 80 is activated again, the actuation valve 70 moves from the rest position to the actuated position 74 which moves the lube valve 60 from the closed position 62 to the open position 64. The movement of the lube valve 60 to the open position 64 pushes the fluid from the cavity 88 through the check valve 96 and to the outlet. Allowing fluid to remain flowing to the clutch after the clutch input 80 has been deactivated allows the flow to the clutch to be metered passively and does not require added electronics. Additionally, using the bailing system 34 to re-use excess fluid eliminates the need for a pump while still re-using the excess fluid.

Figure 9:
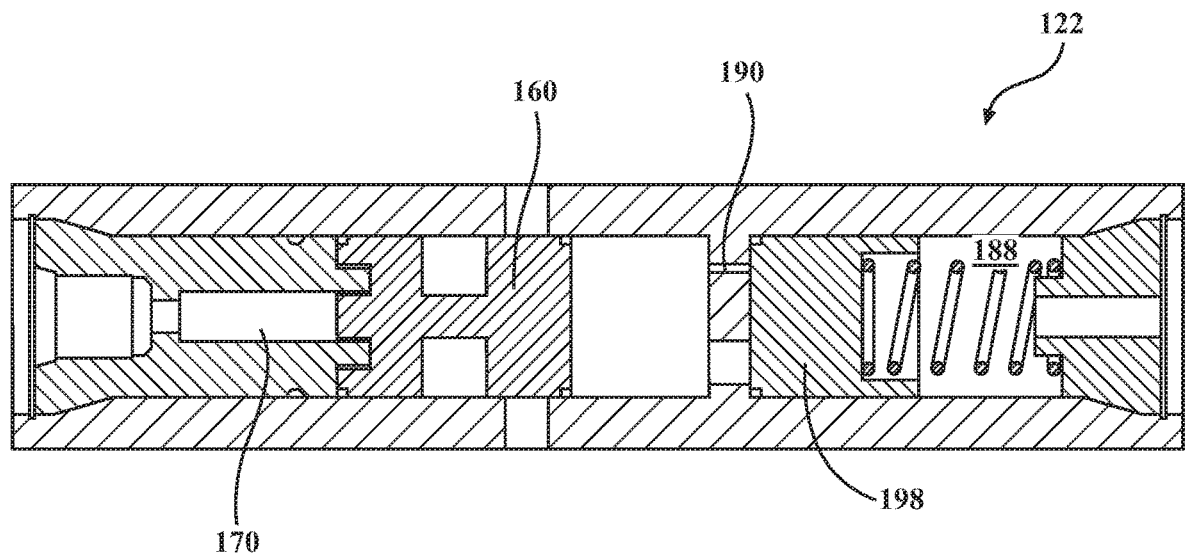
FIG. 9 is a cross-sectional view of a clutch system according to another embodiment.
Figure 10:
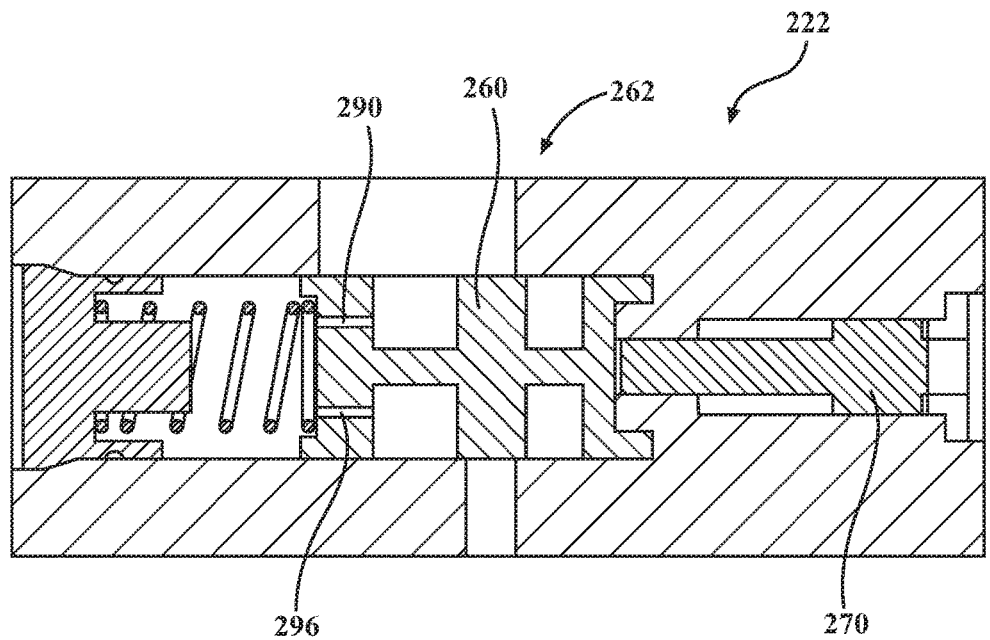
FIG. 10 is a cross-sectional view of a clutch system according to yet another embodiment.
Figure 11:
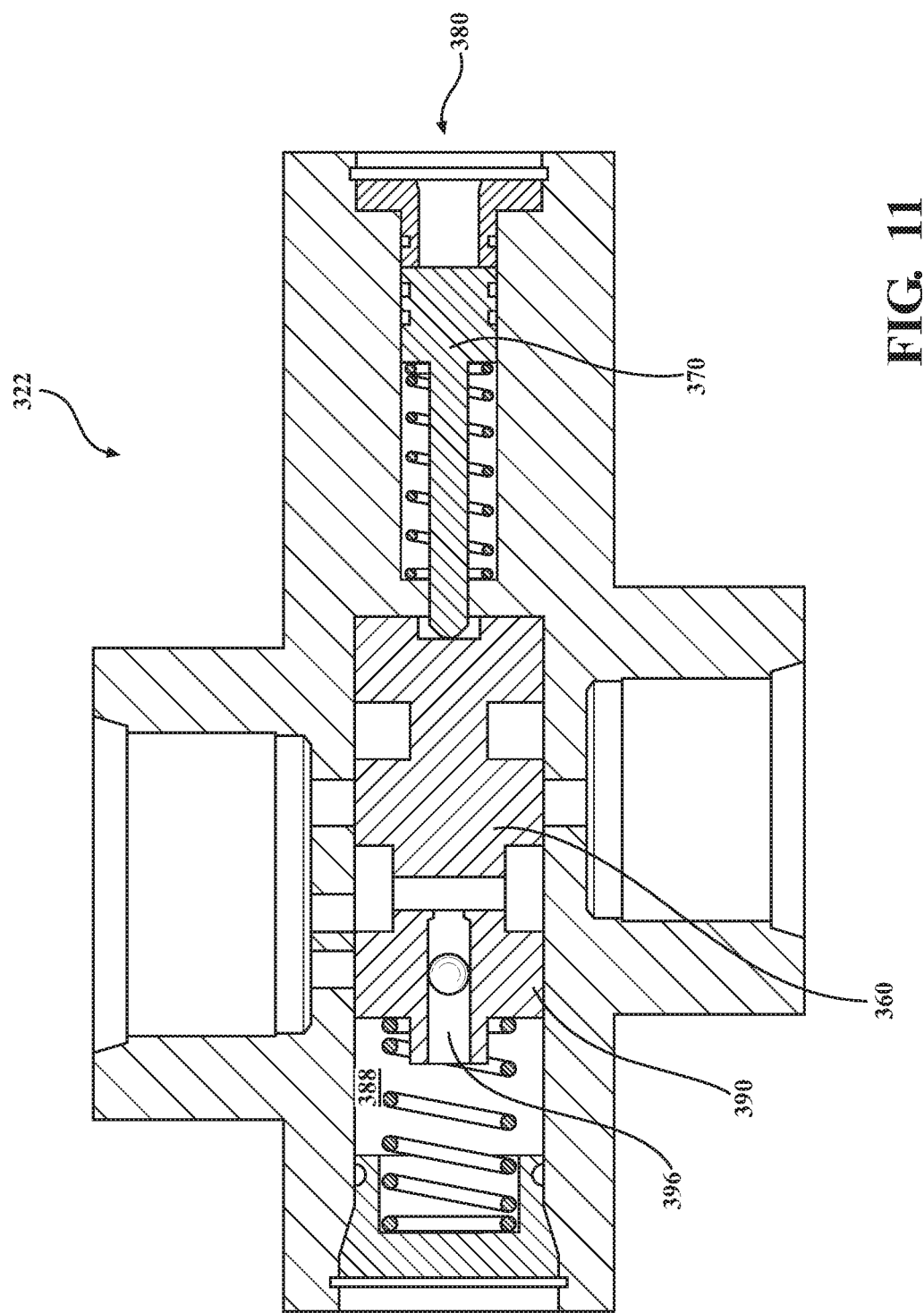
FIG. 11 is a cross-sectional view of a clutch system according to yet another embodiment.

Referring now to FIGS. 9-11, various embodiments of the hydraulic control valve 122, 222, 322 are also contemplated. The hydraulic control valves 122, 222, 322 illustrated in FIGS. 9-11 may be used in lieu of the hydraulic control valve 22 described above. As illustrated in FIGS. 9-11, various configurations of the cavity 188 288, 388, lube valve 160, 260, 360 and actuation valve 170, 270, 370 have been contemplated as well as various locations for the orifice 190, 290, 390.

More specifically, the embodiment illustrated in FIG. 9 includes the lube valve 160, the actuation valve 170, and a third valve 198. In the embodiment illustrated in FIG. 9, the third valve 198 is independent of the lube valve 160 and the actuation valve 170 while the movement of the lube valve 160 and the actuation valve 170 are dependent on one another.

In the embodiment illustrated in FIG. 10, the hydraulic control valve 222 includes the lube valve 260 and the actuation valve 270 which are similar to the hydraulic control valve 22 described above. However, in the embodiment illustrated in FIG. 10, the orifice 290 and the check valve 296 are defined/disposed within the lube valve. In the embodiment illustrated in FIG. 10, the lube valve and the actuation valve 270 move dependent on one another. Moreover, the orifice 290 controls the movement of the lube valve back to the closed position 262 by fluid being sucked into the cavity 288 due to the force from the movement of the lube valve and the actuation valve 270.

In the embodiment illustrated in FIG. 11, the hydraulic control valve 322 is similar to the embodiment illustrated in FIG. 10 having the orifice 390 and the check valve 396 defined/disposed within the lube valve 360. Additionally, the spring 376 of the actuation valve 370 is an independent spring 376 such that the actuation valve 370 can move independently of the lube valve 360. Again, in the embodiment illustrated in FIG. 11, the orifice 390 controls the movement of the lube valve 360 back to the closed position 362 by fluid being sucked into the cavity 388 due to the force from the movement of the lube valve 360.

In operation, the embodiments of the hydraulic control valve 122, 222, 322 illustrated in FIGS. 9-11 operate similarly to the embodiment of the hydraulic control valve 22 illustrated in FIGS. 5-9. More specifically, when the engine 12 is activated, the clutch plate 20 begins rotating. The rotating clutch plate 20 uses the protrusion 28 to guide excess fluid from the clutch plate 20 into the reservoir 36. When the clutch input 80 is activated, i.e. by a driver pressing a clutch pedal, the actuation valve 170, 270, 370 moves from the rest position to the actuated position which moves the lube valve 160, 260, 360 from the closed position to the open position. When the lube valve 160, 260, 360 is in the open position 64, fluid flows freely in the first fluid flow path 54 such that fluid from the reservoir 36 goes through the hydraulic control valve 122, 222, 322 and to the clutch. When the clutch input 80 is deactivated, i.e. by a driver letting go of the clutch pedal, at least the actuation valve 170, 270, 370 moves from the actuated position back to the rest position. The cavity 188, 288, 388 then fills with fluid from the reservoir 36 which flows through the orifice 190, 290, 390 before entering the cavity 188, 288, 388. The controlled fluid flow of the orifice 190, 290, 390 moves at least the lube valve 160, 260, 360 back to the closed position. The flow of the fluid from the reservoir 36 to the cavity 188, 288, 388 is controlled by the orifice 190, 290, 390 such that the movement of the lube valve 160, 260, 360 back to the closed position is slowed which provides additional fluid to the clutch 20. This additional fluid allows for cooling of the clutch and reduced drag. When the clutch input 80 is activated again, the actuation valve 170, 270, 370 moves from the rest position to the actuated position which moves the lube valve 160, 260, 360 from the closed position to the open position. The movement of the lube valve 160, 260, 360 to the open position pushes the fluid from the cavity 188, 288, 388 through the check valve 196, 296, 396 and to the outlet.

Allowing fluid to remain flowing to the clutch after the clutch input 80 has been deactivated allows the flow to the clutch to be metered passively and does not require added electronics. Additionally, using the bailing system 34 to re-use excess fluid eliminates the need for a pump while still re-using the excess fluid.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A clutch system operably coupled to a vehicle engine, said clutch system comprising:
    a clutch plate configured to rotate when the engine is activated;
    a reservoir coupled with said clutch plate, wherein said reservoir is configured to receive excess fluid bailed from said clutch plate upon rotation of said clutch plate; and
    a hydraulic control valve fluidly coupled with said clutch plate and said reservoir and defining a first fluid flow path between said clutch plate and said reservoir, said hydraulic control valve comprising:
        a projection defining an orifice fluidly coupled with said reservoir, and
        a lube valve configured to move between a closed position wherein said first fluid flow path is blocked and an open position wherein said first fluid flow path is fully open;
    wherein a cavity is defined in said hydraulic control valve when said lube valve is in said closed position or between said closed position and said open position;
    wherein the movement of said lube valve between said closed position and said open position is controlled using the fluid from said reservoir which is configured to flow through said orifice and into said cavity.

2. The clutch system of claim 1, wherein said clutch system does not include a pump.

3. The clutch system of claim 1, wherein said clutch plate includes at least one protrusion extending from said clutch plate, wherein said at least one protrusion is configured to guide the excess fluid bailed from said clutch towards said reservoir.

4. The clutch system of claim 3, wherein said at least one protrusion comprises a plurality of radially extending protrusions which are circumferentially spaced about said clutch plate.

5. The clutch system of claim 1, wherein said lube valve is moved between said closed position and said open position based on a mechanical or hydraulic input, wherein said input acts directly on an actuation piston to move said actuation piston between a first position and a second position which actuates said lube valve to move between said closed position and said open position.

6. The clutch system of claim 5, wherein said lube valve is configured to move between said open position and said closed position independent of said actuation piston.

7. The clutch system of claim 1, wherein said lube valve is moved from said closed position to said open position based on a driver input.

8. The clutch system of claim 1, wherein said clutch system is disposed within a manual transmission.

9. The clutch system of claim 1, wherein said clutch system is disposed within a dual clutch transmission.

10. The clutch system of claim 1, wherein said hydraulic control valve further comprises a check valve disposed at an outlet of said hydraulic control valve configured to allow fluid to be removed from said cavity.

11. The clutch system of claim 8, wherein said clutch system is disposed within a bellhousing.

12. A vehicle transmission system operably coupled to a vehicle engine, said transmission comprising
    a vehicle transmission coupled to the vehicle engine and comprising a bellhousing; and
    a clutch system disposed within said bellhousing, said clutch system comprising
        a clutch plate configured to rotate when the engine is activated;
        a reservoir coupled with said clutch plate, wherein said reservoir is configured to receive excess fluid bailed from said clutch upon rotation of said clutch plate;

a hydraulic control valve fluidly coupled with said clutch plate and said reservoir and defining a first fluid flow path between said reservoir and said clutch plate, said hydraulic control valve comprising
a projection defining an orifice fluidly coupled with said reservoir;
a lube valve configured to move between a closed position wherein said first fluid flow path is blocked and an open position wherein said first fluid flow path is fully open; wherein a cavity is defined in said hydraulic control valve when said lube valve is in said closed position or between said closed position and said open position;
wherein the movement of said lube valve between said open position and said closed position is controlled using the fluid from said reservoir which is configured to flow through said orifice and into said cavity.

13. The vehicle transmission of claim 12, wherein said clutch plate includes at least one protrusion extending from said clutch plate, said at least one protrusion configured to guide the excess fluid from said clutch towards said reservoir.

14. The vehicle transmission of claim 13, wherein said at least one protrusion comprises a plurality of radially extending protrusions which are circumferentially-spaced about said clutch plate.

15. The vehicle transmission of claim 12, wherein said clutch system does not include a pump.

16. The vehicle transmission of claim 12, wherein the vehicle transmission is a manual transmission.

17. A method of controlling a hydraulic control valve in a clutch system operably coupled to a vehicle engine, the clutch system comprising a clutch plate configured to rotate when the engine is activated; a reservoir coupled with the clutch plate, and the hydraulic control valve fluidly coupled with the clutch plate and the reservoir and defining a first fluid flow path between the reservoir and the clutch plate, the hydraulic control valve comprising a projection defining an orifice fluidly coupled with the reservoir; and a lube valve configured to move between a closed position wherein the first fluid flow path is blocked and an open position wherein the first fluid flow path is fully open; wherein a cavity is defined in the hydraulic control valve when the lube valve is in the closed position or between the closed position and the open position, said method comprising:
bailing excess fluid from the clutch plate into the reservoir upon rotation of the clutch plate;
moving the lube valve between the closed position and the open position such that fluid from the reservoir lubricates the clutch plate; and
using fluid from the reservoir into the cavity through the orifice to control the movement of the lube valve back to the closed position.

18. The method of claim 17, further comprising guiding the excess fluid from the clutch plate into the reservoir upon rotation of the clutch plate using a plurality of protrusions disposed about the clutch plate.

19. The method of claim 17, wherein the lube valve is moved between the closed position and the open position based on a mechanical or hydraulic input.

20. The method of claim 17, wherein the clutch system does not include a pump.

21. A clutch system operably coupled to a vehicle engine and at least partially disposed with a bellhousing, said clutch system comprising:
a clutch plate configured to rotate when the engine is activated;
a reservoir coupled with said clutch plate, wherein said reservoir is configured to receive excess fluid bailed from said clutch plate upon rotation of said clutch plate; and
a hydraulic control valve fluidly coupled with said clutch plate and said reservoir and defining a first fluid flow path between said clutch plate and said reservoir, said hydraulic control valve comprising:
a projection defining an orifice fluidly coupled with said bellhousing, and
a lube valve configured to move between a closed position wherein said first fluid flow path is blocked and an open position wherein said first fluid flow path is fully open;
wherein a cavity is defined in said hydraulic control valve when said lube valve is in said closed position or between said closed position and said open position;
wherein the movement of said lube valve between said closed position and said open position is controlled using the fluid from the bellhousing which is configured to flow through said orifice and into said cavity.

22. The clutch system of claim 21, wherein said clutch system does not include a pump.

23. The clutch system of claim 21, wherein said clutch plate includes at least one protrusion extending from said clutch plate, wherein said at least one protrusion is configured to guide the excess fluid bailed from said clutch towards said reservoir.

24. The clutch system of claim 23, wherein said at least one protrusion comprises a plurality of radially extending protrusions which are circumferentially spaced about said clutch plate.

25. The clutch system of claim 21, wherein said lube valve is moved between said closed position and said open position based on a mechanical or hydraulic input, wherein said input acts directly on an actuation piston to move said actuation piston between a first position and a second position which actuates said lube valve to move between said closed position and said open position.

26. The clutch system of claim 25, wherein said lube valve is configured to move between said open position and said closed position independent of said actuation piston.

27. The clutch system of claim 21, wherein said lube valve is moved from said closed position to said open position based on a driver input.

28. The clutch system of claim 21, wherein said clutch system is disposed within a manual transmission.

29. The clutch system of claim 21, wherein said clutch system is disposed within a dual clutch transmission.

30. The clutch system of claim 21, wherein said hydraulic control valve further comprises a check valve disposed at an outlet of said hydraulic control valve configured to allow fluid to be removed from said cavity.

31. The clutch system of claim 30, wherein said outlet of said hydraulic control valve is fluidly coupled with said reservoir such that fluid removed from said cavity is removed to said reservoir.

32. A vehicle transmission system operably coupled to a vehicle engine, said transmission system comprising:
a vehicle transmission coupled to the vehicle engine and comprising a bellhousing; and
a clutch system disposed within said bellhousing, said clutch system comprising
a clutch plate configured to rotate when the engine is activated;

a reservoir coupled with said clutch plate, wherein said reservoir is configured to receive excess fluid bailed from said clutch upon rotation of said clutch plate;

a hydraulic control valve fluidly coupled with said clutch plate and said reservoir and defining a first fluid flow path between said reservoir and said clutch plate, said hydraulic control valve comprising a projection defining an orifice fluidly coupled with said bellhousing;

a lube valve configured to move between a closed position wherein said first fluid flow path is blocked and an open position wherein said first fluid flow path is fully open; wherein a cavity is defined in said hydraulic control valve when said lube valve is in said closed position or between said closed position and said open position;

wherein the movement of said lube valve between said open position and said closed position is controlled using the fluid from said bellhousing which is configured to flow through said orifice and into said cavity.

33. The vehicle transmission of claim 32, wherein said clutch plate includes at least one protrusion extending from said clutch plate, said at least one protrusion configured to guide the excess fluid from said clutch towards said reservoir.

34. The vehicle transmission of claim 33, wherein said at least one protrusion comprises a plurality of radially extending protrusions which are circumferentially-spaced about said clutch plate.

35. The vehicle transmission of claim 32, wherein said clutch system does not include a pump.

36. The vehicle transmission of claim 32, wherein the vehicle transmission is a manual transmission.

37. A method of controlling a hydraulic control valve in a clutch system operably coupled to a vehicle engine and disposed within a bellhousing, the clutch system comprising a clutch plate configured to rotate when the engine is activated; a reservoir coupled with the clutch plate, and the hydraulic control valve fluidly coupled with the clutch plate and the reservoir and defining a first fluid flow path between the reservoir and the clutch plate, the hydraulic control valve comprising a projection defining an orifice fluidly coupled with the bellhousing; and a lube valve configured to move between a closed position wherein the first fluid flow path is blocked and an open position wherein the first fluid flow path is fully open; wherein a cavity is defined in the hydraulic control valve when the lube valve is in the closed position or between the closed position and the open position, said method comprising:

bailing excess fluid from the clutch plate into the reservoir upon rotation of the clutch plate;

moving the lube valve between the closed position and the open position such that fluid from the reservoir lubricates the clutch plate; and using fluid from the bellhousing into the cavity through the orifice to control the movement of the lube valve back to the closed position.

38. The method of claim 37, further comprising guiding the excess fluid from the clutch plate into the reservoir upon rotation of the clutch plate using a plurality of protrusions disposed about the clutch plate.

39. The method of claim 37, wherein the lube valve is moved between the closed position and the open position based on a mechanical or hydraulic input.

40. The method of claim 37, wherein the clutch system does not include a pump.

* * * * *